United States Patent
Pechmeze et al.

[11] 3,947,435
[45] Mar. 30, 1976

[54] DISAZO ACID COMPOUNDS CONTAINING ONE SULPHONIC ACID GROUP AND ONE PHOSPHONIC OR METHYL-PHOSPHINIC ACID GROUP

[75] Inventors: Jacques Pierre Edmond Pechmèze, Paris; Robert Frédéric Michel Sureau, Enghien les Bains; Claude Marie Henri Emile Brouard, Sotteville les Rouen, all of France

[73] Assignee: Produits Chimiques Ugine Kuhlmann, Paris, France

[22] Filed: Nov. 13, 1973

[21] Appl. No.: 415,474

[30] Foreign Application Priority Data
Nov. 13, 1972 France .............................. 72.40114

[52] U.S. Cl. ................. 260/190; 260/174; 260/171; 260/185; 260/191; 260/196; 260/502.5
[51] Int. Cl.² .......................................... C09B 31/04
[58] Field of Search ........... 260/174, 177, 185, 190, 260/191

[56] References Cited
UNITED STATES PATENTS

| | | | |
|---|---|---|---|
| 2,277,243 | 3/1942 | Manz.................................... | 260/205 |
| 2,861,067 | 11/1958 | Andrew et al. ................. | 260/177 X |
| 3,580,901 | 5/1971 | Feeman .............................. | 260/191 |
| 3,814,749 | 6/1974 | Feeman .............................. | 260/190 |

OTHER PUBLICATIONS
Colour Index, 3rd Ed., The Society of Dyers & Colourists; England, 1971, Vol. IV, pp. 4230–4231, (C. I. Nos. 26360, 26361 & 26400).
IBID., p. 4228, (C. I. Nos. 26207 & 26210).

*Primary Examiner*—Charles F Warren
*Attorney, Agent, or Firm*—Beveridge, DeGrandi, Kline & Lunsford

[57] ABSTRACT
The disazo compounds of the formula:

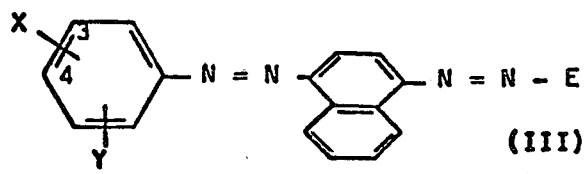

in which X is fixed in position 3 or 4 and represents

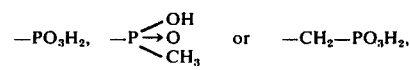

Y represents hydrogen, chlorine, methoxy or nitro and E represents the residue N-ethyl-N-(m or p-sulphobenzyl)-4-amino-phenyl or 4-phenyl-amino-5-sulpho-naphthyl(1).

Process for the preparation of the disazo compounds claimed in claim 1 wherein α-naphthylamine is coupled with the diazo derivative of an amine of the formula:

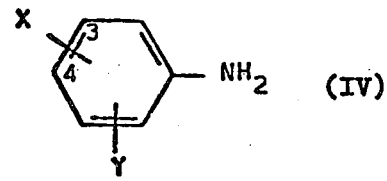

in which X and Y have the same significance as in claim 1, the monoazo dyestuff thus obtained of the formula:

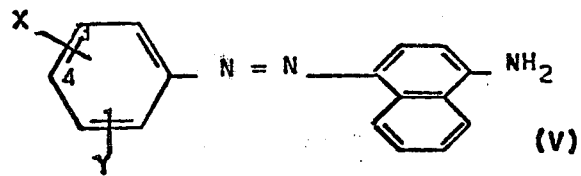

is diazotised and the diazo-monoazo derivative is coupled with N-ethyl-N-(m- or p-sulphobenzyl)aniline or 1-phenyl-amino-naphthalene-8-sulphonic acid.

7 Claims, No Drawings

DISAZO ACID COMPOUNDS CONTAINING ONE SULPHONIC ACID GROUP AND ONE PHOSPHONIC OR METHYL-PHOSPHINIC ACID GROUP

The invention relates to new disazo acid dyestuffs which may be used for the colouration of fibres based on polyamides.

Disazo disulphonic acid dyestuffs are already used for the colouration of natural polyamide fibres, especially wool. A number of these dyestuffs have also been recommended for the colouration of synthetic polyamide fibres; the disazo dyestuffs corresponding to the two structures (I) and (II) have been proposed for this purpose:

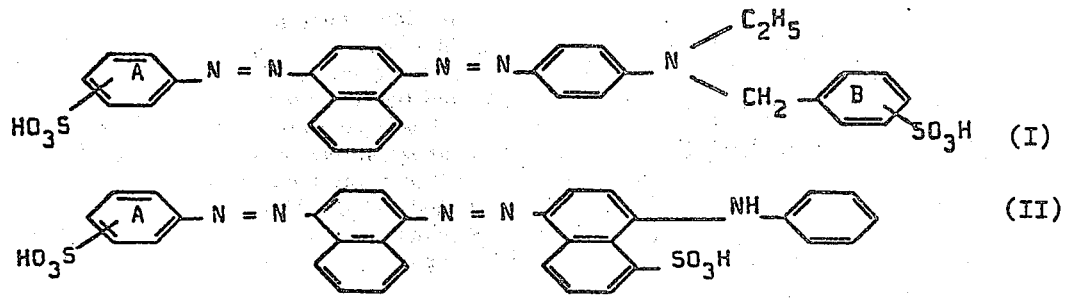

In the nucleus A the sulphonic group can occupy any position. The nucleus A can also carry non-solubilising substituents. In the nucleus B the sulphonic group is in the meta or para position with respect to the methylene group.

The present invention relates to new acid disazo dyestuffs corresponding to the general formula:

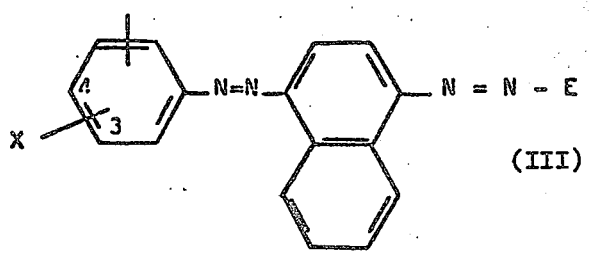

in which X is fixed in the position 3 or 4 and represents

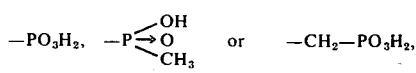

$-PO_3H_2$, $-P\overset{\rightarrow O}{\underset{CH_3}{\diagdown OH}}$ or $-CH_2-PO_3H_2$, Y represents hydrogen, chlorine, methoxy or nitro and E represents the residue N-ethyl-N-(m- or p-sulphobenzyl)-4-amino-phenyl or 4-phenylamino-5-sulpho-naphthyl(1).

The new compounds of formula (III) may be prepared, for example, by coupling α-naphthylamine with the diazo derivative of an amine of the general formula:

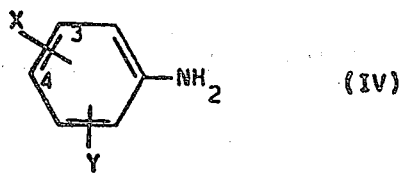

in which X and Y have the same significance as above, diazotising the monoazo compound thus obtained of the formula:

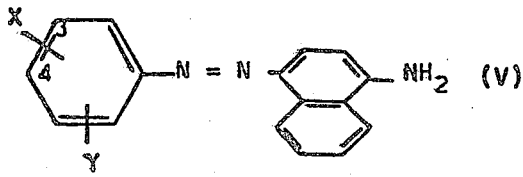

and coupling the diazo-monoazo derivative with N-ethyl-N-(m- or p-sulphobenzyl)aniline or 1-phenylamino-naphthalene-8-sulphonic acid.

The new compounds of formula (III) are taken up very well on natural or synthetic polyamide fibres, on which they may be applied by dyeing, foularding or printing and give uniform shades, which are particularly fast to light and washing.

The dyeing may be effected for example in acid, neutral or slightly alkaline aqueous medium at a temperature ranging from 70°C. to 100°C., preferably at the boiling temperature of the dyebath. By "slightly alkaline" we mean, for example, up to a pH of 8.

Compared with their sulphonated homologues of formulae I or II, the phosphonic dyestuffs of formula III are generally distinguished by better fastness, an increased tinctorial power, a higher saturation, and a better covering of bars.

In the following Examples, which are purely illustrative, the parts and the percentages are by weight unless the contrary is indicated.

EXAMPLE I

A solution of 17.8 parts of meta-amino-phenyl-phosphonic acid in 100 parts of water containing also 11 parts of sodium carbonate and 6.9 parts of sodium nitrite is added drop by drop at a temperature between 0°C. and 5°C. to a mixture of 15 parts of concentrated sulphuric acid and 80 parts of ice. Then 20 parts of crystalline sodium acetate are added. The diazo solution obtained is run into a suspension of 14.3 parts of α-naphthylamine in 500 parts of water and 12 parts of 30% hydrochloric acid while maintaining the temperature between 0°C. and 10°C. The mixture is stirred for an hour and filtered.

The monoazo dyestuff obtained is dissolved in 1500 parts of water and 27 parts of a 30% solution of sodium hydroxide. 5.5 parts of sodium nitrite are added and this solution is run on to 36 parts of 30% hydrochloric acid and 50 parts of water while maintaining the temperature between 15°C. and 20°C. The excess of nitrous acid is then destroyed by the addition of sulphamic acid.

The diazo solution thus obtained is introduced, without the temperature being allowed to exceed 10°C., into a solution prepared beforehand by dissolving 29.1 parts of N-ethyl-N-(sulphobenzyl)aniline in 100 parts of water and 10 parts of crystalline sodium acetate and addition of 13 parts of 30% sodium hydroxide. When the coupling is ended, the disazo dyestuff is salted out by the addition of sodium chloride, filtered off and dried. It dyes polyamide fibres a fast bordeaux shade.

The N-ethyl-N-(sulphobenzyl) aniline can be obtained by sulphonation of N-ethyl-N-benzyl-aniline.

EXAMPLE 2

29.9 parts of 1-phenylamino-naphthalene-8-sulphonic acid are dissolved in 400 parts of water by the addition of 22 parts of a 30% solution of sodium hydroxide. 15 parts of 40% acetic acid are then slowly added, with vigorous agitation, and then 10 parts of crystalline sodium acetate. A diazo solution obtained by operating as indicated in the first two paragraphs of Example 1 from 17.8 parts of m-amino-phenylphosphonic acid and 14.3 parts of α-naphthylamine is run into the suspension obtained above at a temperature between 5°C. and 10°C. When the coupling is ended, the pH is adjusted to 11.5 by the addition of a 30% solution of sodium hydroxide and the disazo dyestuff is salted out by the addition of sodium chloride, filtered off and dried. It dyes polyamide fibres a deep blue shade, which is full-bodied and fast.

The following Table lists other Examples of compounds of formula (III), prepared according to the instructions given in Examples 1 and 2.

phosphonic acid crystallising with one molecule of water are obtained.

| Analysis | C % | H % | N % | P % |
|---|---|---|---|---|
| Found: | 33.56 | 3.71 | 5.50 | 12.45 |
| Calculated for $C_7H_8NO_6P + H_2O$ | 33.46 | 3.98 | 5.58 | 12.35 |

50 parts of 3-nitro-4-methoxy-phenylphosphonic acid and 300 parts of distilled water are introduced into an apparatus provided with a stirring device and the pH is adjusted to 9 by the addition of a 30% aqueous solution of sodium hydroxide. Then a solution of 160 parts of crystalline sodium sulphide in 350 parts of distilled water is introduced with stirring. The mixture is heated at the boil for 2 hours, then acidified by the addition of 250 parts by volume of concentrated hydrochloric acid ($d = 1.18$) and filtered to remove the precipitated sulphur. The filtrate is concentrated to a final volume of about 400 parts by volume, then neutralised until a feeble acid reaction to Congo red is obtained by the addition of a 30% aqueous solution of sodium hydroxide. The precipitate formed is filtered off, washed with distilled water until the mineral salts are completely eliminated, and dried. 35.4 parts of 3-amino-4-methoxy-phenylphosphonic acid crystallising with 0.5 molecule of water are thus obtained.

| Analysis: | C% | H% | N% | P% |
|---|---|---|---|---|
| Found | 40.29 | 5.16 | 6.60 | 14.67 |
| Calculated for $C_7H_{10}NO_4P + \tfrac{1}{2}H_2O$ | 39.62 | 5.19 | 6.60 | 14.62 |

| Example | X (position) | Y (position) | E | Shade on polyamides |
|---|---|---|---|---|
| 3 | $-P{\overset{OH}{\underset{CH_3}{\rightarrow}}}O$ (3) | H | N-ethyl-N-(sulphobenzyl)-4-amino-phenyl | bordeaux |
| 4 | " | " | 4-phenylamino-5-sulpho-naphthyl (1) | deep blue |
| 5 | $-PO_3H_2$ (3) | Cl (6) | " | " |
| 6 | " | methoxy (6) | " | " |
| 7 | $-CH_2-PO_3H_2$ (4) | " | " | " |

The 3-amino-4-methoxy-phenylphosphonic acid used for the preparation of the disazo dyestuff of Example 6 is a new product. It may be prepared by operating as follows:

300 parts of 66°Bé concentrated sulphuric acid and 188 parts of 4-methoxy-phenylphosphonic acid obtained according to the process described by H. Z. Lecher, R. A. Greenwood, K. C. Whitehouse and T. H. Chao, J. Amer.Chem.Soc., 1956, 78, 5020, and 65 parts of fuming nitric acid ($d$=1.52) are introduced into an apparatus provided with a stirring device, while maintaining the temperature below or equal to 0°C. When all the nitric acid has been introduced, the temperature is allowed to return to the ambient temperature and the mixture is stirred for a further hour. The reaction mass is then poured on to 1000 parts of crushed ice. The precipitate is filtered off, washed with distilled water until the sulphuric acid is completely eliminated, and finally recrystallised from 1000 parts of distilled water. 170 parts of 3-nitro-4-methoxy-phenyl-

We claim:
1. A disazo compound of the formula:

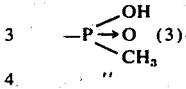

in which X is fixed in position 3 or 4 and represents

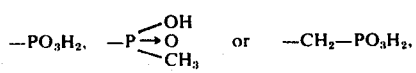

Y represents hydrogen, chlorine, methoxy or nitro and E is N-ethyl-N-(m or p-sulphobenzyl)-4-amino-phenyl or 4-phenyl-amino-5-sulpho-naphthyl(1).

2. A disazo compound of the formula:

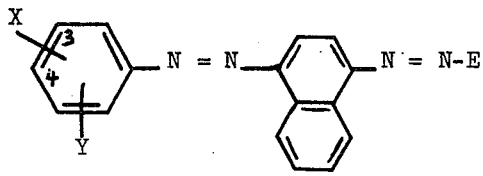

in which X is fixed in position 3 or 4 and represents

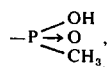

Y represents hydrogen, chlorine, methoxy or nitro and E is N-ethyl-N-(m or p-sulphobenzyl)-4-amino-phenyl or 4-phenyl-amino-5-sulpho-naphthyl(1).

3. A disazo compound of the formula:

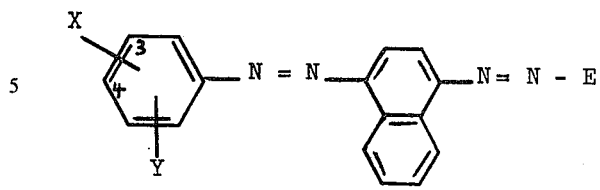

in which X is fixed in position 3 or 4 and represents $-CH_2-PO_3H_2$, Y represents hydrogen, chlorine, methoxy or nitro and E is N-ethyl-N-(m or p-sulphobenzyl)-4-amino-phenyl or 4-phenyl-amino-5-sulpho-naphthyl(1).

4. The 3-{4-[N-ethyl-N-(sulphobenzyl)-4-aminophenylazo]-naphthyl (1) azo}-phenylphosphonic acid.

5. The 3-{4-[4-phenylamino-5-sulpho-naphthyl(1) azo]naphthyl(1) azo}-phenylphosphonic acid.

6. The 3-{4-[N-ethyl-N-(sulphobenzyl)-4-aminophenylazo]naphthyl (1) azo}-phenyl-methyl-phosphinic acid.

7. The 3-{4-[4-phenylamino-5 sulpho-naphthyl (1) azo]naphthyl(1) azo}-phenyl-methyl-phosphinic acid.

* * * * *